(12) United States Patent
Kucinovic

(10) Patent No.: US 8,768,615 B2
(45) Date of Patent: Jul. 1, 2014

(54) NAUTICAL LICENSE IDENTIFICATION SYSTEM

(75) Inventor: Predrag Kucinovic, Carrara (IT)

(73) Assignee: The Boeing Company, Chicago, IL (US)

( * ) Notice: Subject to any disclaimer, the term of this patent is extended or adjusted under 35 U.S.C. 154(b) by 141 days.

(21) Appl. No.: 13/442,027

(22) Filed: Apr. 9, 2012

(65) Prior Publication Data

US 2013/0268188 A1 Oct. 10, 2013

(51) Int. Cl.
*G01C 21/00* (2006.01)
(52) U.S. Cl.
USPC ............ 701/410; 701/400; 701/532; 701/533
(58) Field of Classification Search
USPC .................................. 701/410, 400, 533, 532
See application file for complete search history.

(56) References Cited

U.S. PATENT DOCUMENTS

| 6,266,610 | B1 * | 7/2001 | Schultz et al. | 701/528 |
| 6,459,372 | B1 * | 10/2002 | Branham et al. | 340/539.1 |
| 2008/0133121 | A1 * | 6/2008 | Sato | 701/123 |
| 2009/0045909 | A1 * | 2/2009 | Miller | 340/5.8 |
| 2013/0126679 | A1 * | 5/2013 | Estkowski et al. | 244/190 |

OTHER PUBLICATIONS

"Rules: Pound Net Set Prohibited Areas," Department of Environment and Natural Resources, Division of Marine Fisheries, State of North Carolina, Sep. 2006, 3 pages, accessed Jul. 9, 2013 http://portal.ncdenr.org/c/docunnent_library/get_file?uuid=0a38dc00-1468-4ee3-aa5a-0ecb036d19f5&groupId=38337.

* cited by examiner

*Primary Examiner* — Fady Jabr
*Assistant Examiner* — Yazan A Soofi
(74) *Attorney, Agent, or Firm* — Yee & Associates, P.C.

(57) ABSTRACT

A method and apparatus for identifying a set of needed permissions for a vehicle. A travel plan is identified for the vehicle. Information is identified about the vehicle. The set of needed permissions is identified for the vehicle to travel using the travel plan.

20 Claims, 5 Drawing Sheets

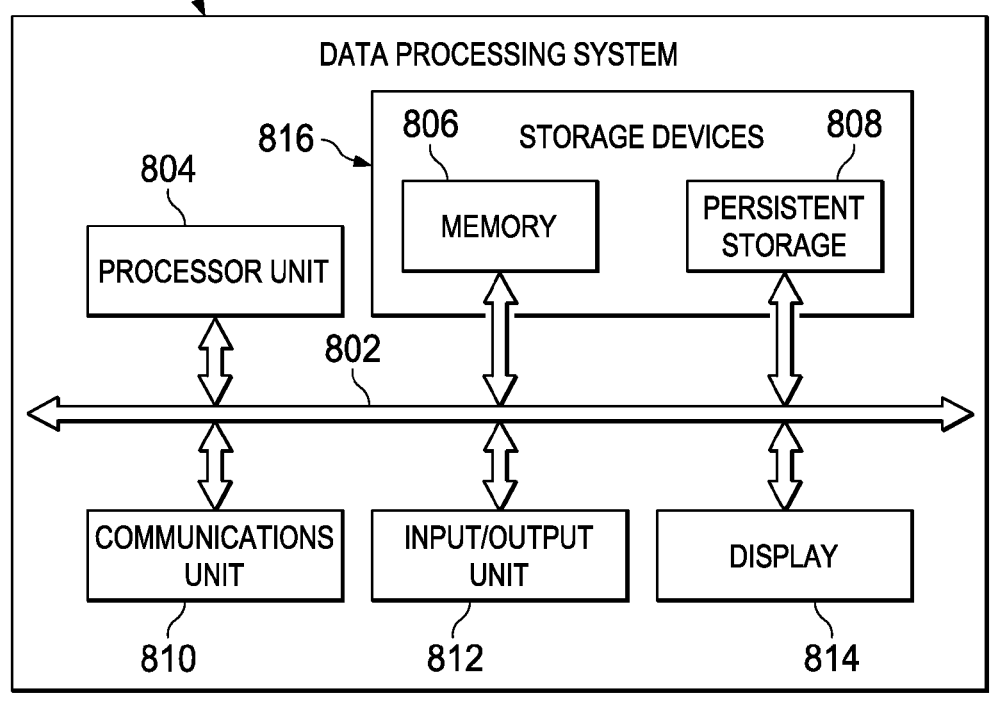
FIG. 8
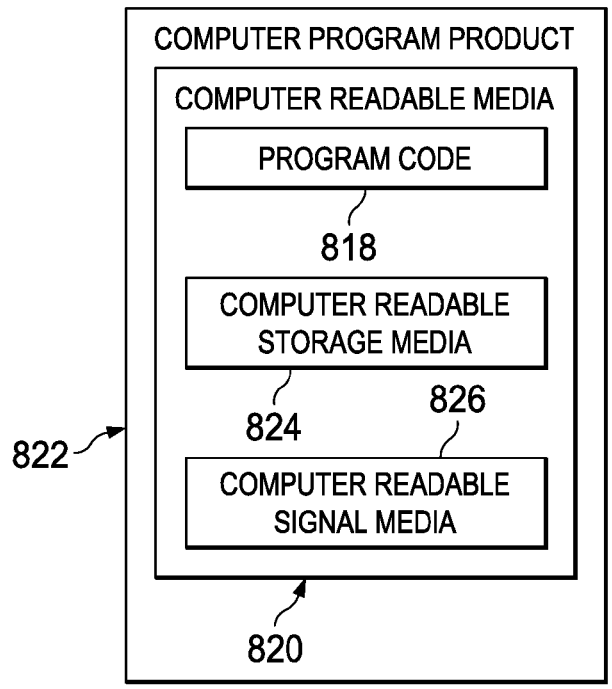

NAUTICAL LICENSE IDENTIFICATION SYSTEM

BACKGROUND INFORMATION

1. Field

The present disclosure relates generally to operating ships and, in particular, to licenses needed for operating ships. Still more particularly, the present disclosure relates to a method and apparatus for identifying licenses needed to operate a ship while following a travel plan for the ship.

2. Background

Operating a ship may require different types of licenses, depending on the location in which the ship is operated. For example, different countries may have different levels of licenses or types of licenses required to operate the ship. The license required by a country may depend on various factors, such as the type of ship, the type of activity planned for the ship, the experience of the operators, and other suitable factors. Some countries may allow ships to operate within their boundaries without the need for a license, depending on the type of ship.

Penalties for not having the appropriate license may be more costly than desired for the operator of a ship. Therefore, it would be desirable to have a method and apparatus that takes into account at least some of the issues discussed above as well as possibly other issues.

SUMMARY

In one illustrative embodiment, a method for identifying a set of needed permissions for a vehicle is present. A travel plan is identified for the vehicle. Information is identified about the vehicle. The set of needed permissions is identified for the vehicle to travel using the travel plan.

In another illustrative embodiment, a method for identifying permissions for a vehicle is provided. A number of locations is identified for the vehicle. A set of needed permissions is identified for the vehicle based on the number of locations.

In yet another illustrative embodiment, a permissions analysis system comprises a rules database, a geospatial database, and a navigator. The rules database is configured to identify required permissions based on information about a vehicle. The geospatial database is configured to identify a set of potential permissions that may be required based on a number of locations. The navigator is configured to receive the information about the vehicle. The navigator is further configured to identify a number of needed permissions needed based on the information about the vehicle and the number of locations for the vehicle using the rules database and the geospatial database.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

FIG. 8 is an illustration of a data processing system in accordance with an illustrative embodiment.

DETAILED DESCRIPTION

The illustrative embodiments recognize and take into account a number of different considerations. The illustrative embodiments recognize and take into account that an operator of a ship, when generating a travel plan, may generate a route from a start point to a destination point. With this route, the operator may identify boundaries for countries or other entities through which the ship may cross. Based on this information, the operator of the ship may determine whether a license is needed for particular countries or other entities. The different illustrative embodiments, however, recognize and take into account that although this type of planning may aid in identifying licenses needed, the actual route traveled by the ship may deviate from the planned route. This deviation may cause the ship to enter another geographic area controlled by another country for which a license is not present or anticipated.

Further, in some cases, the travel plan may not include a particular route, or the route may change while traveling. In this case, the licenses previously identified may not be valid with the change in route.

Thus, a method and apparatus is present for identifying a set of permissions for a ship. In one illustrative embodiment, a travel plan is identified for the ship to travel from a start point to a destination point. Information for the ship is also identified. A set of licenses needed for the ship to travel from the start point to the destination point is identified. This process also may be performed when the travel of the ship deviates from the travel plan.

Figure 1:
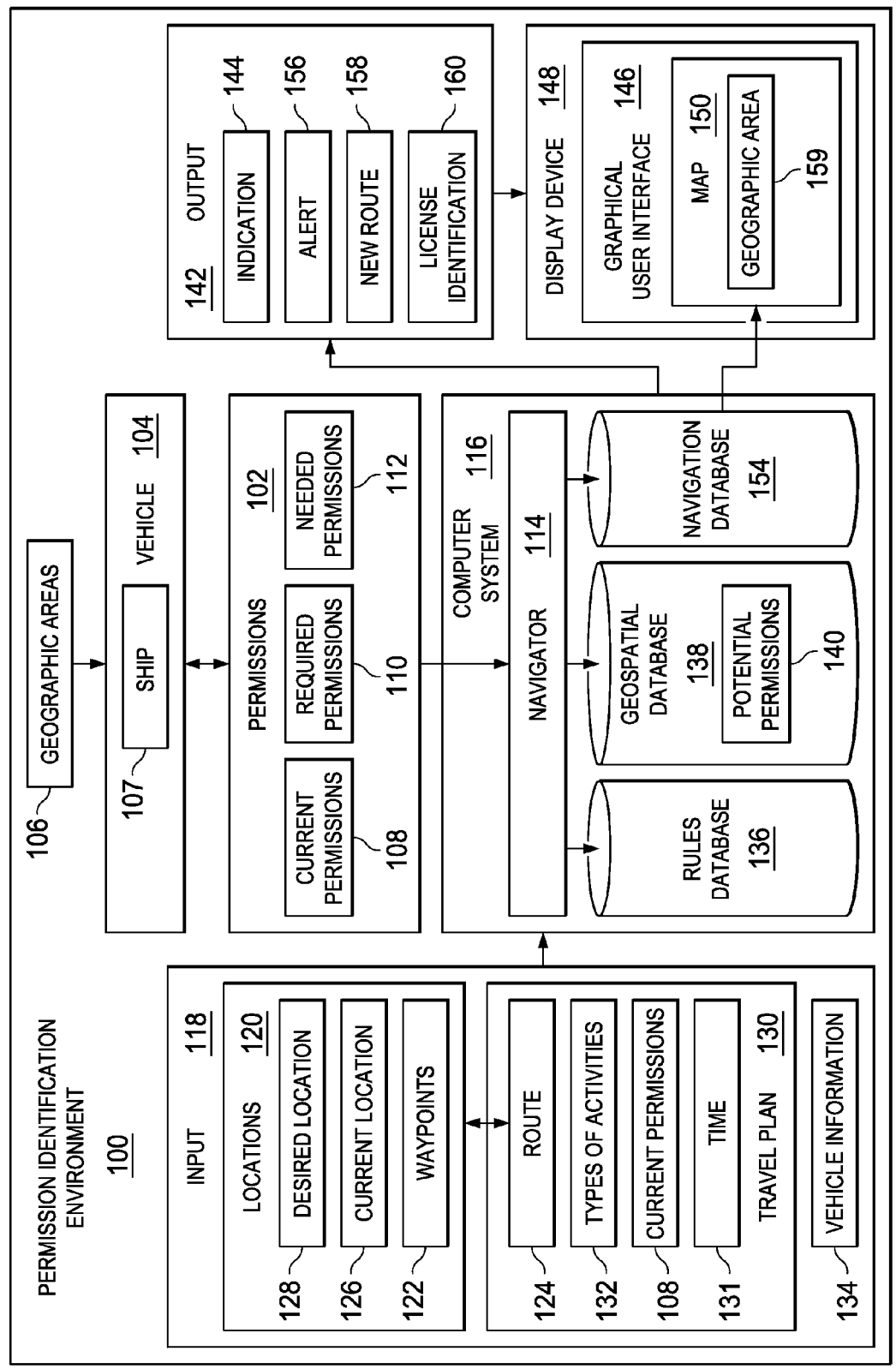
FIG. 1 is an illustration of a block diagram of a permission identification environment in accordance with an illustrative embodiment.

With reference now to the figures and, in particular, with reference to FIG. 1, an illustration of a block diagram of a permission identification environment is depicted in accordance with an illustrative embodiment. In this illustrative example, permission identification environment 100 may be used to identify a number of permissions 102 for vehicle 104. As used herein, a "number of" when used with reference to items, means one or more items. For example, a number of permissions 102 is one or more permissions. In these illustrative examples, a permission within permissions 102 is identified for vehicle 104 based on a number of geographic areas 106.

In these illustrative examples, vehicle 104 may take a number of different forms. In one illustrative example, vehicle 104 takes the form of ship 107. In these illustrative examples, ship 107 may be, for example, without limitation, a surface ship, a cargo ship, a submarine, a cruise ship, a sailboat, a commercial ship, a light marine boat, a military ship, an aircraft carrier, and other suitable types of ships.

In these illustrative examples, permissions 102 include at least one of a set of current permissions 108, a set of required permissions 110, and a set of needed permissions 112. When used with reference to items, a "set of" means zero or more items. For example, a set of current permissions 108 may be no current permissions, one current permission, five current permissions, or some other suitable number of current permissions. In other words, a set may be an empty set in some cases.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

In these illustrative examples, a permission in the set of current permissions 108 is a permission that is currently held by vehicle 104. A required permission in the set of required permissions 110 is a permission needed by vehicle 104. In these illustrative examples, a required permission may also be a current permission if the required permission is one that is already held by vehicle 104. A needed permission in the set of needed permissions 112 is a permission that vehicle 104 does not have but is required to have. In other words, the set of needed permissions 112 may be identified based on any permission missing from the set of current permissions 108 that is required in the set of required permissions 110.

In these illustrative examples, the identification of permissions 102 for vehicle 104 is performed using navigator 114. Navigator 114 may be hardware, software, or a combination of the two. Navigator 114 may be implemented within computer system 116. Computer system 116 is a number of computers in these illustrative examples. When more than one computer is present in computer system 116, those computers may be in communication with each other. In these illustrative examples, navigator 114 may be located in vehicle 104 or in some other remote location.

Navigator 114 identifies permissions 102 for vehicle 104 using input 118. Input 118 may take a number of different forms. For example, input 118 may be a number of locations 120 for vehicle 104. In these illustrative examples, locations 120 are geographic locations referencing locations on the Earth.

As depicted, the number of locations 120 may be, for example, waypoints 122 for route 124 for vehicle 104. In another illustrative example, the number of locations 120 may be current location 126 of vehicle 104. In yet another illustrative example, locations 120 may include desired location 128 for vehicle 104. Desired location 128 may be a location that vehicle 104 is traveling toward in these illustrative examples.

In some illustrative examples, input 118 may include travel plan 130. As depicted, travel plan 130 may include route 124 with waypoints 122, time 131, a number of types of activities 132, and other suitable information.

In these illustrative examples, time 131 may be specified in terms of day, month, year, time of day, and in other suitable forms. Time 131 may be a range of dates or times of the day for travel plan 130.

An activity in the number of types of activities 132 is an activity to be performed using vehicle 104. For example, when vehicle 104 takes the form of ship 107, an activity in the number of types of activities 132 may be recreational, transport, commercial, fishing, and other suitable types of activities.

Vehicle information 134 is information describing the vehicle. This information may include, for example, without limitation, a model, a type, a weight, dimensions, a set of current permissions 108, and other suitable types of information.

In these illustrative examples, navigator 114 uses rules database 136 and geospatial database 138 to identify a set of needed permissions 112 for vehicle 104 from input 118. Rules database 136 is configured to identify required permissions 110 based on vehicle information 134 in these illustrative examples. Rules database 136 also may identify required permissions 110 using other information, such as types of activities 132, time 131, and other suitable information.

Geospatial database 138 is configured to identify potential permissions 140 based on locations 120. Geospatial database 138 is a database that relates permissions to locations on the Earth.

The identification of the set of needed permissions 112 is made by identifying the set of current permissions 108 from vehicle information 134 and identifying the set of required permissions 110. Once these permissions are identified, they may be compared to obtain the set of needed permissions 112.

In identifying the set of needed permissions 112, navigator 114 uses geospatial database 138 and number of locations 120 to identify a set of potential permissions 140.

Potential permissions 140 identified in geospatial database 138 are then used to identify a set of required permissions 110. A potential permission in potential permissions 140 is a permission that is present for a particular location. The potential permission may or may not apply to vehicle 104. Whether a potential permission applies to vehicle 104 is determined using rules database 136.

Whether a potential permission is a required permission in required permissions 110 may be determined using rules database 136 based on at least one of vehicle information 134, time 131, and types of activities 132. Other information also may be used in determining whether a potential permission is a required permission. Time 131 may be used in conjunction with vehicle information 134 or in place of vehicle information 134 to determine whether a potential permission is a required permission.

In these illustrative examples, some permissions required in a particular location may only apply to certain vehicle types, vehicle lengths, vehicle weights, vehicle ages, vehicle dimensions, type of ownership, type of user, and other information about vehicle 104.

For example, a different set of required permissions 110 may be identified for an aircraft carrier than the set of required permissions 110 for a cargo ship. In still another illustrative example, when vehicle 104 is a ground vehicle, different permissions may be needed for different types of ground vehicles. For example, a different set of required permissions 110 may be identified for a commercial truck than the set of required permissions 110 for a car. A commercial truck may need a license for weight while a car does not. In another example, a commercial truck that carries petrochemicals may need a different license than a commercial truck that carries produce or livestock.

In another example, the set of required permissions 110 may depend on the type of user of vehicle 104. For example, the set of required permissions 110 may vary if the user owns, rents, or charters vehicle 104. As yet another example, the vehicle length of vehicle 104 also may affect what is in the set of required permissions 110. Further, a determination as to whether a potential permission is a needed permission also may be based on a type of activity in types of activities 132 and/or a particular time for time 131.

After a set of needed permissions 112 is identified for vehicle 104, navigator 114 compares the set of required permissions 110 with the set of current permissions 108 for vehicle 104. Any permission in the set of needed permissions 112 not found in the set of current permissions 108 is a needed permission in the set of needed permissions 112. In other words, a permission missing from the set of current permissions 108 that is in the set of required permissions 110 is a needed permission in the set of needed permissions 112.

Navigator 114 then generates output 142. Output 142 may take various forms. In these illustrative examples, output 142 may be at least one of indication 144, alert 156, new route 158, license identification 160, and other suitable types of output.

In these illustrative examples, indication 144 may be displayed on graphical user interface 146 on display device 148. Display device 148 is a hardware device and may be located in computer system 116 or in some other location, depending on the particular implementation. In still other illustrative examples, map 150 may be displayed on graphical user interface 146. Indication 144 may be displayed on map 150 to indicate which geographic area 159 from geographic areas 106 a needed permission in the set of needed permissions 112 for vehicle 104 is required. In still other illustrative examples, route 124 also may be displayed on map 150. With this type of display, navigation database 154 is used to generate map 150 in these illustrative examples.

In some illustrative examples, alert 156 may be generated as part of output 142 when current location 126 of vehicle 104 is in geographic area 159 where a permission needed in the set of current permissions 108 is missing for vehicle 104. In other words, alert 156 may be generated when vehicle 104 is outside of a geographic area covered by the set of current permissions 108 for vehicle 104.

In still other illustrative examples, navigator 114 also may make changes to route 124 if a needed permission in the set of needed permissions 112 cannot be obtained before vehicle 104 enters or travels through geographic area 159 where the needed permission is absent. The change to route 124 may be displayed as new route 158 for consideration by the operator of vehicle 104. This new route may be calculated as one that takes vehicle 104 through geographic areas within geographic areas 106 covered by current permissions 108.

In this manner, one or more illustrative embodiments may use navigator 114 as a planning tool. For example, navigator 114 may be used to identify the set of needed permissions 112 prior to the travel of vehicle 104. By identifying needed permissions 112 prior to traveling, different routes may be selected, any needed permissions 112 may be obtained, or other suitable actions may be taken. Further, navigator 114 also may be used while vehicle 104 is traveling to indicate whether any needed permissions 112 are identified if vehicle 104 strays from route 124 in travel plan 130.

In other illustrative examples, navigator 114 may be used to identify set of needed permissions 112 based on current location 126 of vehicle 104. Using current location 126 may be useful when travel plan 130 is not present for vehicle 104. In addition to using current location 126, needed permissions 112 may be identified for geographic areas 106 within a selected distance from current location 126.

The illustration of permission identification environment 100 in FIG. 1 is not meant to imply physical or architectural limitations to the manner in which an illustrative embodiment may be implemented. Other components in addition to or in place of the ones Illustrated may be used. Some components may be unnecessary. Also, the blocks are presented to illustrate some functional components. One or more of these blocks may be combined, divided, or combined and divided into different blocks when implemented in an illustrative embodiment.

For example, computer system 116 may be located in another location other than vehicle 104. For example, computer system 116 may be at a land location in which an operator plans travel plan 130. In this manner, a set of needed permissions 112 may be obtained for vehicle 104 prior to beginning travel. In these illustrative examples, output 142 also may include displaying at least one of a list of the set of needed permissions 112, the set of current permissions 108, and the set of required permissions 110.

In other illustrative examples, vehicle 104 may take different forms other than ship 107. For example, vehicle 104 may be selected from one of a car, a truck, an aircraft, a spacecraft, and other suitable types of vehicles.

Figure 2:
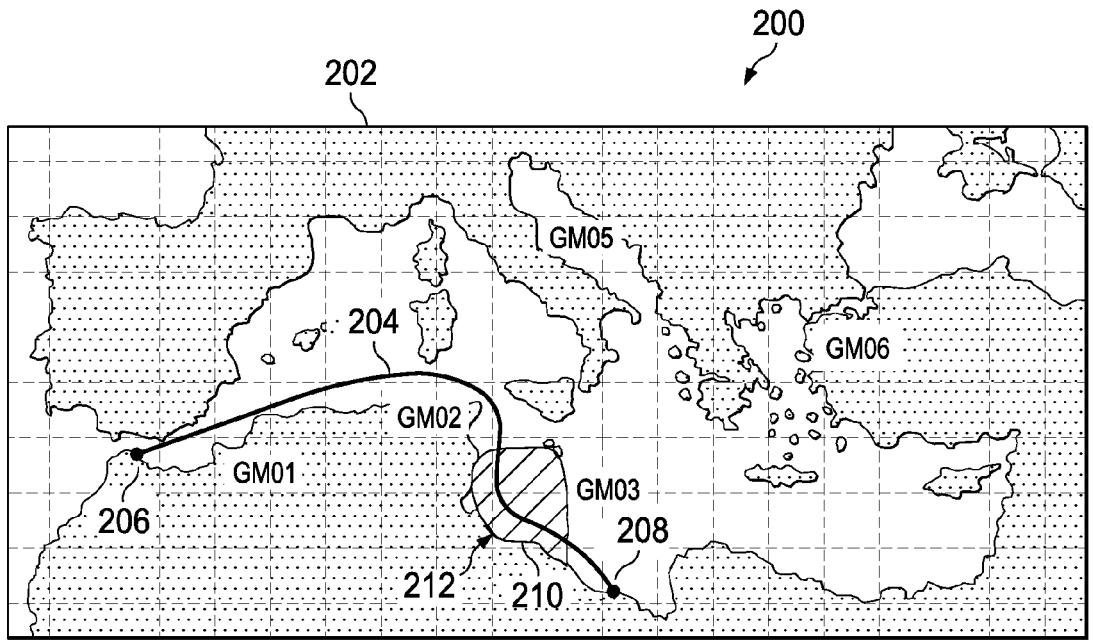
FIG. 2 is an illustration of a graphical user interface for displaying permissions in accordance with an illustrative embodiment.

Turning now to FIG. 2, an illustration of a graphical user interface for displaying permissions is depicted in accordance with an illustrative embodiment. In this depicted example, graphical user interface 200 is an example of an implementation of graphical user interface 146 in FIG. 1. In this depicted example, map 202 is displayed in graphical user interface 200. Map 202 is a nautical map in these illustrative examples.

As depicted, route 204 is displayed in map 202. Route 204 comprises waypoints that include start point 206 and destination point 208. In these illustrative examples, graphical indicator 210 is displayed indicating that a needed permission is present for the ship traveling along route 204. In this illustrative example, graphical indicator 210 is a graphical indicator identifying geographic area 212 in which permission is needed for the vehicle. In this illustrative example, the needed permission may be a license, a registration, a permit, or some other suitable type of permission.

Figure 3:
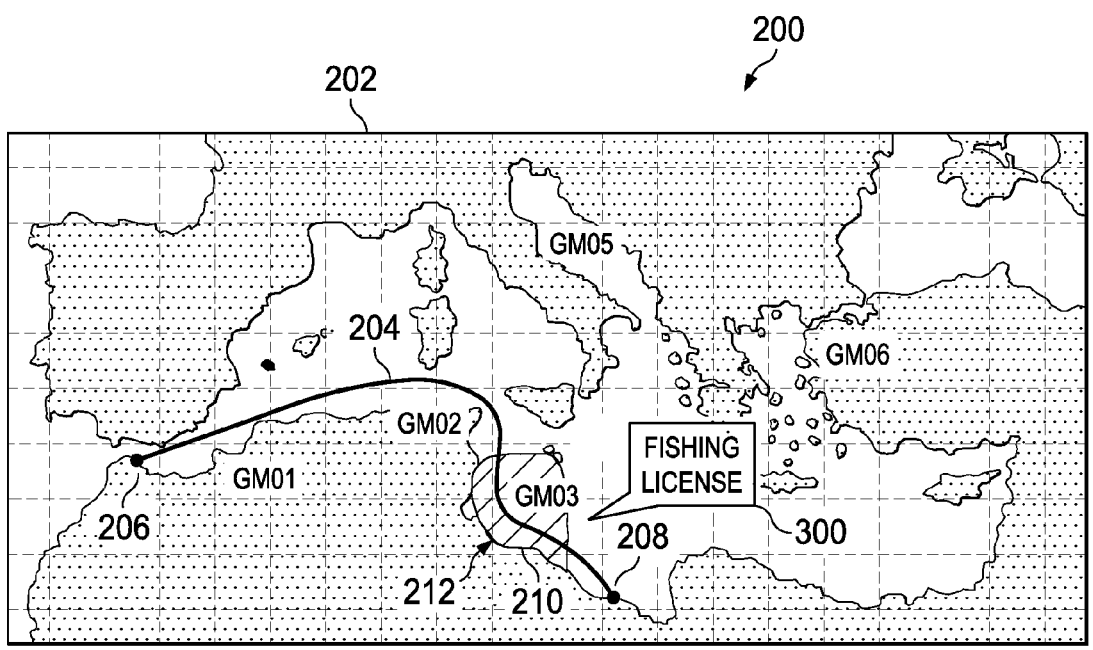
FIG. 3 is an illustration of a display of a needed permission in accordance with an illustrative embodiment.

Turning now to FIG. 3, an illustration of a display of a needed permission is depicted in accordance with an illustrative embodiment. In this illustrative example, a selection of graphical indicator 210 results in graphical indicator 300 being displayed. In this illustrative example, graphical indicator 300 is a tool tip indicating that a fishing license is needed in geographic area 212. Graphical indicator 300 could be selected to provide even more information, such as licensing requirements or links to forums, depending on the particular implementation.

Figure 4:
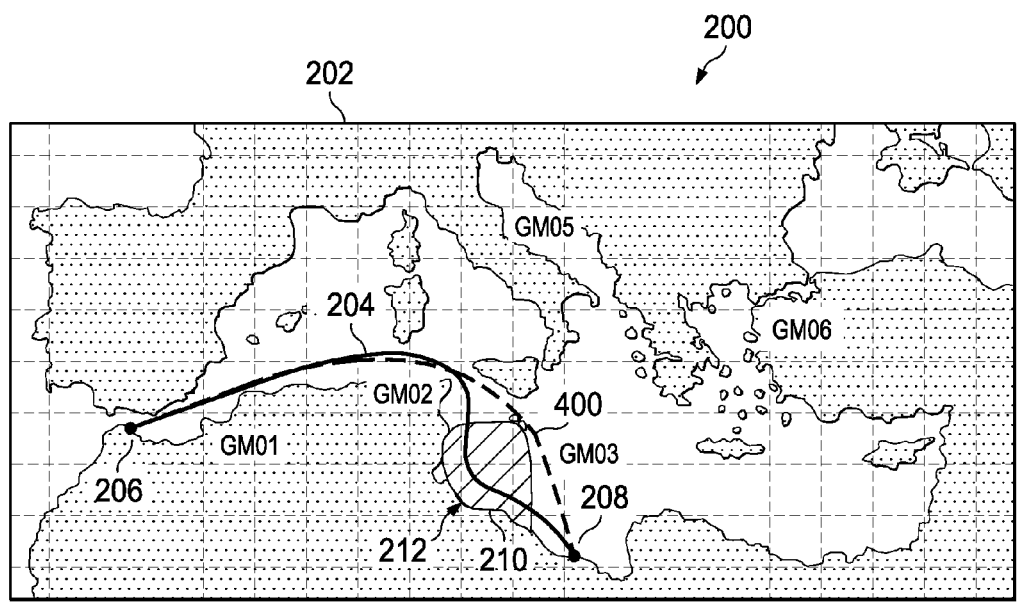
FIG. 4 is an illustration of a new route in accordance with an illustrative embodiment.

Turning now to FIG. 4, an illustration of a new route is depicted in accordance with an illustrative embodiment. In this illustrative example, the needed permission to travel into geographic area 212 may not be obtainable. For example, insufficient time may be present to obtain the needed permission, the ship may not qualify for the permission, the cost of the permission may be cost-prohibitive, or some other reason may be present.

In this situation, navigator 114 in FIG. 1 may generate changes to route 204. In this illustrative example, new route 400 is depicted as a suggested change to route 204. In this case, the operator may choose to use new route 400 or ignore the suggestion, depending on the particular implementation. For example, rather than changing route 204, the activity may be changed such that a permission may not be needed.

The illustrations of outputs in graphical user interface 200 on map 202 in FIGS. 2-4 have been presented for purposes of illustrating a few examples of output 142 in FIG. 1. These examples are not meant to limit the manner in which output

142 may be generated or presented. For example, in some cases, an audible indication may be made. In yet other illustrative examples, other types of presentations may be made for information in output 142. For example, rather than using graphical indicator 300 to indicate the needed permission, another window may be displayed with the identification of the needed permission.

Figure 5:
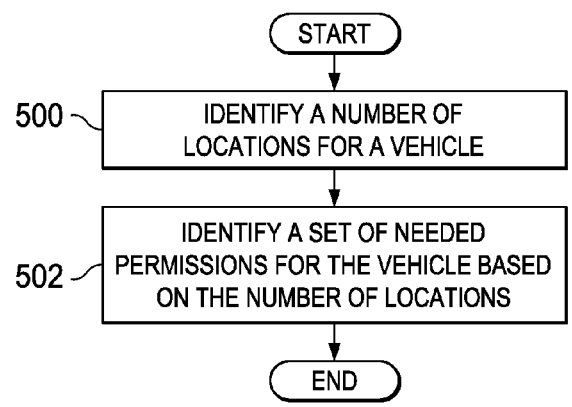
FIG. 5 is an illustration of a high-level flowchart of a process for identifying permission for a vehicle in accordance with an illustrative embodiment.

With reference now to FIG. 5, an illustration of a high-level flowchart of a process for identifying permission for a vehicle is depicted in accordance with an illustrative embodiment. The process illustrated in FIG. 5 may be implemented using navigator 114 in FIG. 1.

The process begins by identifying a number of locations for a vehicle (operation 500). In this illustrative example, the number of locations may be a current location for the vehicle, a desired location for the vehicle, or waypoints in a route for the vehicle. The process then identifies a set of needed permissions for the vehicle based on the number of locations (operation 502), with the process terminating thereafter.

Figure 6:
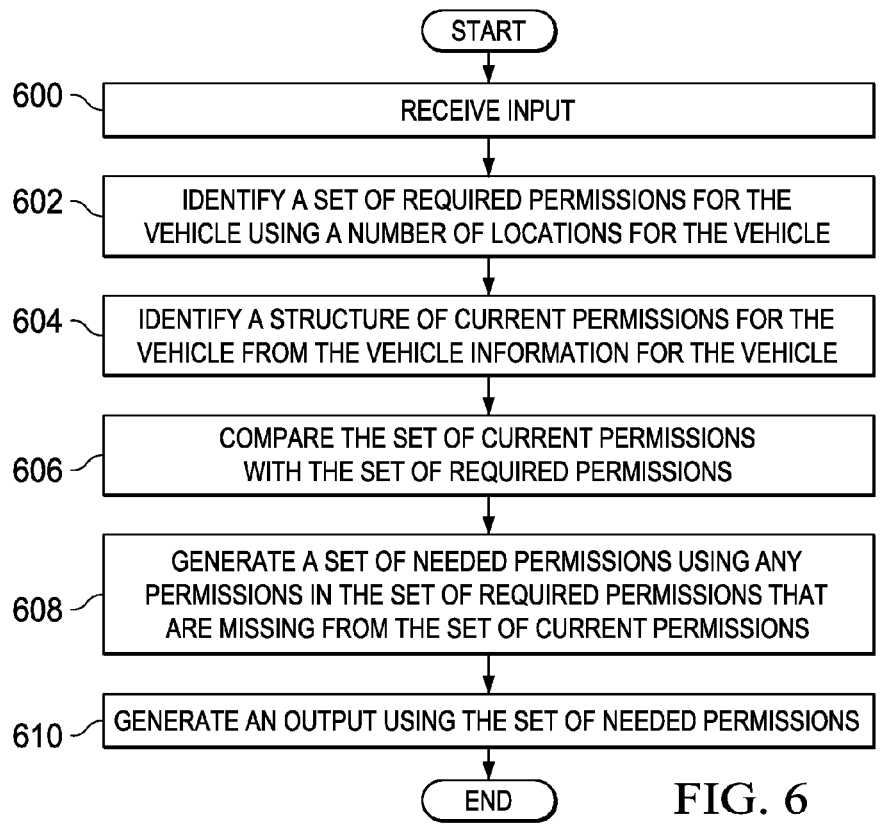
FIG. 6 is an illustration of a flowchart of a process for identifying a set of needed permissions for a vehicle in accordance with an illustrative embodiment.

With reference now to FIG. 6, an illustration of a flowchart of a process for identifying a set of needed permissions for a vehicle is depicted in accordance with an illustrative embodiment. The process illustrated in FIG. 6 may be implemented using navigator 114 for vehicle 104 in FIG. 1.

The process begins by receiving input (operation 600). In these illustrative examples, the input may include at least one of a number of locations for a vehicle, a travel plan for the vehicle, vehicle information for the vehicle, and other suitable types of information.

The process identifies a set of required permissions for the vehicle using a number of locations for the vehicle (operation 602). The process then identifies a structure of current permissions for the vehicle from the vehicle information for the vehicle (operation 604).

The process then compares the set of current permissions with the set of required permissions (operation 606). The process then generates a set of needed permissions using any permissions in the set of required permissions that are missing from the set of current permissions (operation 608). If all of the required permissions in the set of required permissions are present in the set of current permissions, the set of needed permissions is an empty set. In other words, the set of needed permissions indicates that there is not any needed permission for the vehicle. The process then generates an output using the set of needed permissions (operation 610), with the process terminating thereafter.

Figure 7:
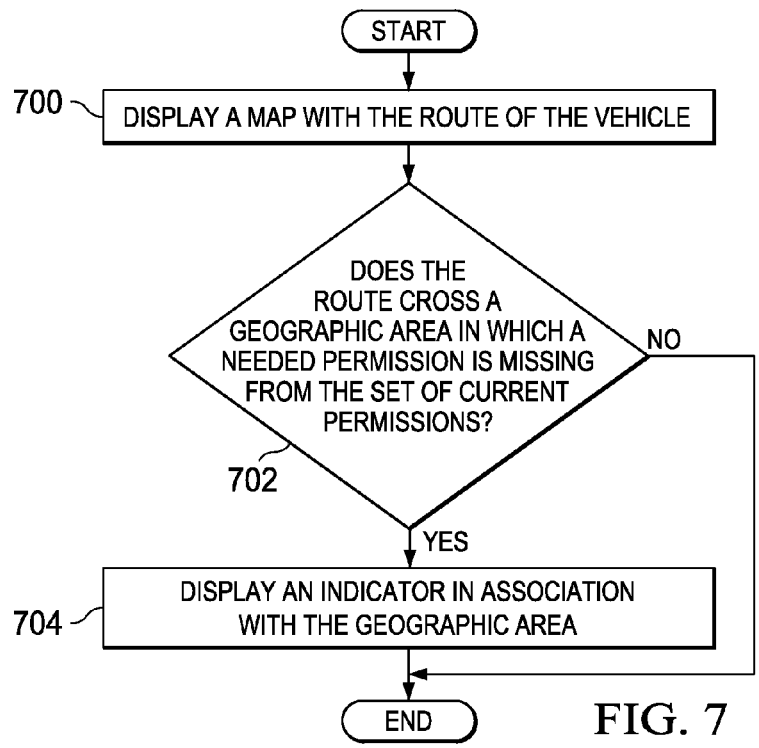
FIG. 7 is an illustration of a flowchart of a process for displaying output generated from identifying a set of needed permissions in accordance with an illustrative embodiment.

Turning now to FIG. 7, an illustration of a flowchart of a process for displaying output generated from identifying a set of needed permissions is depicted in accordance with an illustrative embodiment. The process Illustrated in FIG. 7 may be implemented using navigator 114 in FIG. 1. In particular, this process may be used to display output 142 in graphical user interface 146 on display device 148 in FIG. 1.

The process begins by displaying a map with the route of the vehicle (operation 700). The process determines whether the route crosses a geographic area in which a needed permission is missing from the set of current permissions (operation 702). If the route does not cross a geographic area in which the needed permission is missing, the process terminates. Otherwise, if the route crosses a geographic area in which the needed permission is missing, an indicator is displayed in association with the geographic area (operation 704), with the process terminating thereafter.

The graphical indicator is considered to be associated with the geographic area when a viewer of the indicator understands that the indicator is for the geographic area. For example, the graphical indicator may be displayed on or near the geographic area or as part of the geographic area. The graphical indicator may take a number of different forms. For example, without limitation, the graphical indicator may be text, color, a graphic, an animation, or other suitable types of indicators.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 8, an illustration of a data processing system is depicted in accordance with an illustrative embodiment. Data processing system 800 may be used to implement computer system 116 in FIG. 1. In this illustrative example, data processing system 800 includes communications framework 802, which provides communications between processor unit 804, memory 806, persistent storage 808, communications unit 810, input/output (I/O) unit 812, and display 814. In these examples, communications framework 802 may be a bus system.

Processor unit 804 serves to execute instructions for software that may be loaded into memory 806. Processor unit 804 may be a number of processors, a multi-processor core, or some other type of processor, depending on the particular implementation. A "number", as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications framework 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples.

In one example, computer readable media 820 may be computer readable storage media 824 or computer readable signal media 826. Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800.

In some instances, computer readable storage media 824 may not be removable from data processing system 800. In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications framework 802 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 806, or a cache, such as found in an interface and memory controller hub that may be present in communications framework 802.

Thus, the illustrative embodiments provide a method and apparatus for identifying permissions for a vehicle. In one illustrative embodiment, navigator 114 provides an ability to identify when a vehicle does not have a required permission.

In these illustrative examples, navigator 114 may be used to identify a set of needed permissions for different situations. For example, navigator 114 may identify the set of needed permissions for a vehicle traveling on a travel plan that has a defined route. In other illustrative examples, navigator 114 may be used to prepare a travel plan. In still other illustrative examples, navigator 114 may be used to identify needed permissions for the vehicle based on the current location of the vehicle.

Different illustrative embodiments may be applied do different types of vehicles. For example, an illustrative embodiment may be applied to aircraft in addition to ships. With an aircraft, navigator 114 may be used to identify permissions, such as ratings or sign-offs, that may be require by pilots in different countries or flight information region (FIR) boundaries.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a set of needed permissions for a vehicle, the method comprising:
    identifying, by a processor unit, a travel plan for the vehicle;
    identifying, by the processor unit, a set of current permissions for the vehicle and a set of required permissions for the vehicle to travel using the travel plan;
    identifying, by the processor unit, the set of needed permissions for the vehicle to travel using the travel plan, wherein the set of needed permissions comprises each permission in the set of required permissions for the vehicle that is missing from the set of current permissions; and
    generating, by the processor unit, an alert when a current location of the vehicle is in a geographic area for which there is a needed permission in the set of needed permissions for the vehicle.

2. The method of claim 1 further comprising:
    indicating, by the processor unit, the needed permission is missing from the set of current permissions in response to the set of current permissions not matching the set of required permissions.

3. The method of claim 2, wherein indicating the needed permission is missing from the set of current permissions in response to the set of current permissions not matching the set of required permissions comprises:
    displaying a map with a route of the vehicle; and
    indicating the geographic area on the map crossed by the route for which the needed permission is missing from the set of current permissions.

4. The method of claim 1, wherein the travel plan includes a route of the vehicle and further comprising:
    changing, by the processor unit, the route of the vehicle in response to the set of current permissions not matching the set of needed permissions.

5. The method of claim 1, wherein the travel plan comprises at least one of a route, a time, and a number of types of activities.

6. The method of claim 1, wherein the needed permission in the set of needed permissions is selected from one of a license, a registration, and a permit.

7. The method of claim 1, wherein the vehicle is selected from one of a ship, a surface ship, a cargo ship, a submarine, a cruise ship, a sailboat, an aircraft carrier, a car, a truck, an aircraft, and a spacecraft.

8. The method of claim 1, further comprising:
    displaying a first list comprising the set of needed permissions, a second list comprising the set of current permissions, and a third list comprising the set of required permissions.

9. A method for identifying permissions for a vehicle, the method comprising:
    identifying, by a processor unit, a number of locations for the vehicle;
    identifying, by the processor unit, a set of needed permissions for the vehicle based on the number of locations, wherein the set of needed permissions comprises each permission in a set of required permissions for the vehicle for the number of locations that is missing from a set of current permissions for the vehicle; and
    displaying, using the processor unit, the set of needed permissions for the vehicle on a display device.

10. The method of claim 9, wherein identifying the set of needed permissions for the vehicle based on the number of locations comprises:
    identifying the set of needed permissions for the vehicle based on the number of locations and information about the vehicle.

11. The method of claim 10, wherein identifying the set of needed permissions for the vehicle based on the number of locations and the information about the vehicle comprises:
    identifying the set of needed permissions for the vehicle based on the number of locations, the information about the vehicle, and a number of types of activities for the vehicle.

12. The method of claim 9, wherein the number of locations is selected from one of a number of waypoints for a route in a travel plan for the vehicle and a current location of the vehicle.

13. The method of claim 9, wherein displaying the set of needed permissions for the vehicle on the display device comprises:
    displaying a map with a route of the vehicle; and
    indicating a geographic area on the map crossed by the route for which a needed permission is missing from the set of current permissions.

14. The method of claim 9 further comprising:
    generating, by the processor unit, an output based on the set of needed permissions identified, wherein the output is selected from one of an indication, an alert, a new route, and a license identification.

15. The method of claim 9, wherein the vehicle is selected from one of a ship, a surface ship, a cargo ship, a submarine, a cruise ship, a sailboat, an aircraft carrier, a car, a truck, an aircraft, and a spacecraft.

16. A permissions analysis system comprising:
   a rules database configured to identify required permissions based on information about a vehicle;
   a geospatial database configured to identify a set of potential permissions that may be required based on a number of locations for the vehicle;
   a navigator configured to receive the information about the vehicle and identify a set of needed permissions based on the information about the vehicle and the number of locations for the vehicle using the rules database and the geospatial database, wherein the rules database, the geospatial database, and the navigator are implemented in a computer system and wherein the set of needed permissions comprises each permission in a set of required permissions for the vehicle for the number of locations that is missing from a set of current permissions for the vehicle; and
   a display device configured to display a map with a route in a travel plan for the vehicle and to indicate a geographic area on the map crossed by the route for which there is a needed permission in the set of needed permissions.

17. The method of claim 9, wherein:
   displaying the set of needed permissions further comprises displaying a list comprising the set of needed permissions.

18. The permissions analysis system of claim 16, wherein in being configured to identify the set of needed permissions for the vehicle based on the number of locations, the navigator is configured to identify the set of needed permissions for the vehicle based on the number of locations and the information about the vehicle.

19. The permissions analysis system of claim 16, wherein the number of locations is selected from one of a number of waypoints for the route in the travel plan for the vehicle and a current location of the vehicle.

20. The permissions analysis system of claim 16, wherein:
   the display device is further configured to display a list selected from the group consisting of: the set of needed permissions, the set of current permissions, and the set of required permissions.

* * * * *